United States Patent [19]

Testa et al.

[11] Patent Number: 5,158,477
[45] Date of Patent: Oct. 27, 1992

[54] BATTERY CONNECTOR AND METHOD

[75] Inventors: Bruce A. Testa, Ocean; Arnold Bard, Elberon, both of N.J.

[73] Assignee: The United States of America as represented by the Secretary of the Army, Washington, D.C.

[21] Appl. No.: 792,827

[22] Filed: Nov. 15, 1991

[51] Int. Cl.⁵ ............................................. H01R 00/00
[52] U.S. Cl. .................................... 439/507; 439/500
[58] Field of Search ............... 439/489, 507, 512, 513, 439/514, 509, 45, 46, 152, 388, 389; 429/121, 65, 178, 180

[56] References Cited

U.S. PATENT DOCUMENTS

| | | | |
|---|---|---|---|
| 3,193,788 | 7/1965 | Brown | 439/46 |
| 3,718,750 | 2/1973 | Sayers | 439/389 |
| 4,195,897 | 4/1980 | Plevjak | 439/152 |
| 4,391,479 | 7/1983 | Wessel | 439/45 |

Primary Examiner—Larry I. Schwartz
Assistant Examiner—Hien D. Vu
Attorney, Agent, or Firm—Michael Zelenka; William H. Anderson

[57] ABSTRACT

A battery connector for use in a battery having an inner sensor circuit in order to turn on and shut off the inner sensor circuit automatically when respectively connecting and disconnecting the battery for extending the battery storage shelf life. The battery connector includes a metal connector pin, a socket receiving the pin having a first metal positive conductor and having a second metal sensor circuit conductor, an insulator between the conductors, and a bridge for electrical conduction past the insulator between the first and second conductors and between the first conductor and the pin.

5 Claims, 2 Drawing Sheets

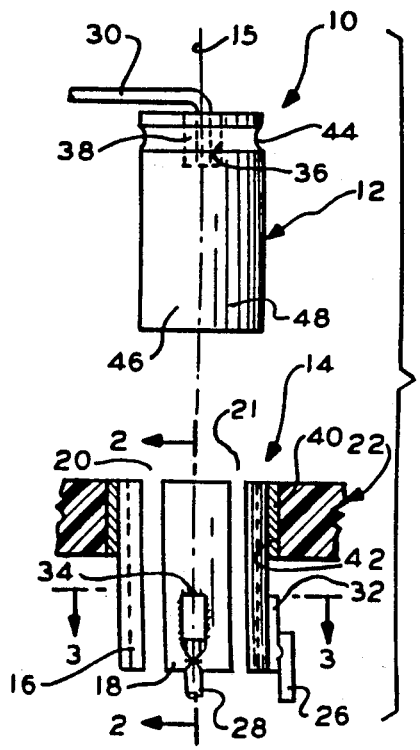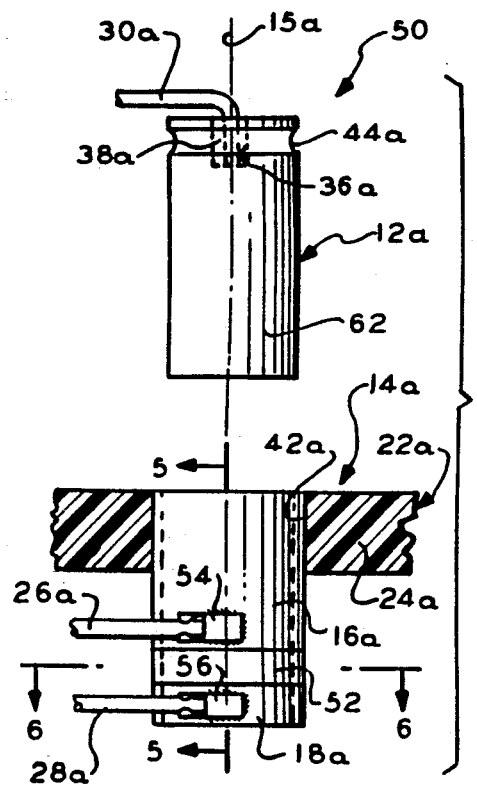

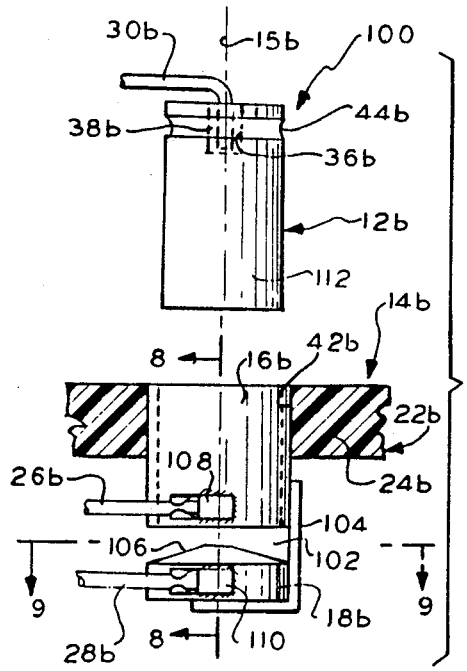
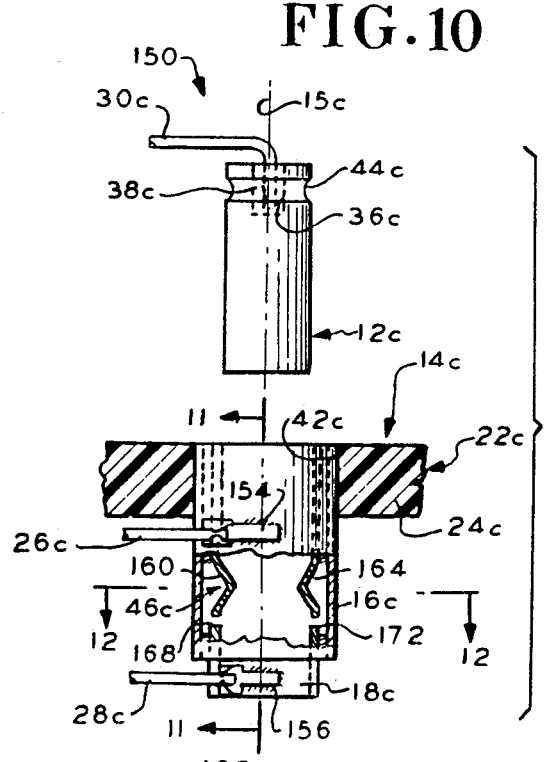
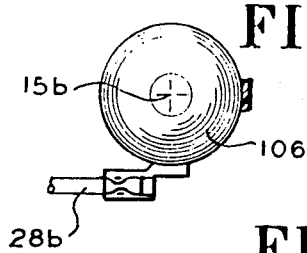
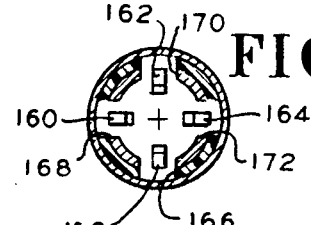
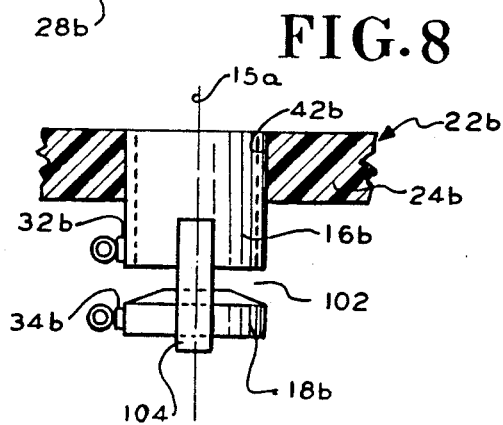
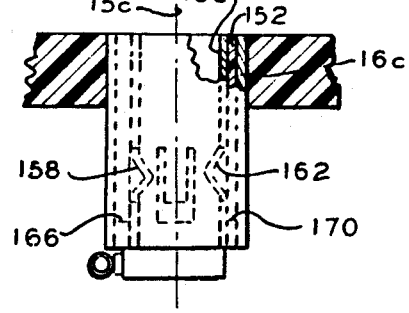

BATTERY CONNECTOR AND METHOD

GOVERNMENTAL INTEREST

The invention described herein may be manufactured, used, and licensed by or for the Government for governmental purposes without the payment to us of any royalty thereon.

FIELD OF THE INVENTION

The invention relates in general to a battery connector and method of connection, and in particular the invention relates to a battery connector having a pin and a multi-connector socket.

BACKGROUND OF THE INVENTION

In certain types of lithium batteries it is important to monitor the condition of the battery cells. This is done for a variety of safety reasons, and can be implemented in a conventional way using an electrical sensor circuit.

The problem with the prior art battery sensor circuit is that it is continuously on from the time the battery is packaged. The resultant power drain, regardless of the amount, causes a negative impact on the storage shelf life of the battery.

SUMMARY OF THE INVENTION

According to the present invention, a battery connector is provided. This connector comprises: a pin; a socket disposed in a battery wall within which the pin is inserted for making a battery connection and from which the pin is removed for making a battery disconnection; said socket having a first metal conductor for connecting the pin to the battery positive portion; said socket having a second metal conductor for connecting the pin to a sensor circuit; said socket having an insulating means disposed between the first metal conductor and the second metal conductor; and a bridge means which forms an electrical connection from the first metal conductor to the second metal conductor only when the pin is disposed in the socket.

By using the bridge means, the problem of leaving the sensor circuit continuously on and the resultant drain on the battery is avoided.

Also, according to the invention, a method is provided of making a connector to turn on and shut off an interior sensor circuit of a battery for extending the storage shelf life thereof. This method includes the steps of: forming a pin for connection to an exterior positive connector; forming a first conductor inside the battery for connection to a battery positive portion; forming a second conductor disposed inside the battery for connection to a sensor circuit; forming an insulator disposed between the first conductor and the second conductor; and bridging from the first conductor to the second conductor and simultaneously bridging from the first conductor through the pin to the exterior positive connector.

One object of the invention is to provide a battery connector for a battery having an inner sensor circuit which can be turned off during storage of the battery.

Another object of the invention is to provide an automatic connection and disconnection of a battery sensor circuit during a corresponding connection and disconnection of the battery connector.

BRIEF DESCRIPTION OF THE DRAWINGS

These and other objects, features and details of the invention will become apparent in light of the ensuing detailed disclosure, and particularly in light of the drawings wherein:

FIG. 1 is an exploded elevation view of a battery connector according to the present invention;

FIG. 2 is a sectional view as taken along the line 2—2 of FIG. 1;

FIG. 3 is a section view as taken along the line 3—3 of FIG. 1;

FIG. 4 is an exploded elevation view of a second embodiment of a battery connector according to the present invention;

FIG. 5 is a sectional view as taken along the line 5—5 of FIG. 4;

FIG. 6 is a sectional view as taken along the line 6—6 of FIG. 4;

FIG. 7 is an exploded elevation view of a third embodiment of a battery connector according to the present invention;

FIG. 8 is a sectional view as taken along the line 8—8 of FIG. 7;

FIG. 9 is a sectional view as taken along the line 9—9 of FIG. 7;

FIG. 10 is an exploded elevation view of a fourth embodiment of a battery connector according to the present invention;

FIG. 11 is a sectional view as taken along the line 11—11 of FIG. 10; and

FIG. 12 is a sectional view as taken along the line 12—12 of FIG. 10.

DETAILED DESCRIPTION

As shown in FIGS. 1, 2 and 3, a battery connector 10 is provided. Connector 10 has a metal equipment plug or pin 12, and has a socket or receptacle 14, in which pin 12 can be positioned or inserted. Pin 12 and socket 14 have a common axis 15. Pin 12 can be disconnected from socket 14 during storage, or the like.

Socket 14 has a first conductor or metal plate 16, and has a second conductor or metal plate 18. Socket 14 also has a pair of insulating slots or air gaps or insulating mediums 20, 21. Slots 20, 21 separate first conductor 16 from second conductor 18. Socket 14 is mounted on battery 22, which has an insulating battery wall 24, from which it projects for receiving pin 12.

First conductor 16 has an insulate wire or lead 26. Second conductor 18 has a second insulated wire or lead 28. Pin 12 has a third insulated wire or lead 30 which is fixedly connected thereto. Lead 26 has a vertical metal crimp clip 32, which is crimped over an end portion of the lead 26. Clip 32 is tack welded to conductor 16. Lead 28 has a vertical metal crimp clip 34 which is crimped over lead 28 at its end portion. Clip 34 is also tack welded to conductor 18. Pin 12 has a blind hole 36, which contains a solder material 38 that fixedly connects lead 30 at its end portion to pin 12 within hole 36. Pin 12 has an outside diameter which has a selected tolerance relative to inside diameters of conductors 16, 18, in order to provide easy assembly and good electrical contact therebetween.

Conductors 16, 18 have a support ring 40 to which they are fixedly connected using an adhesive (not shown) or the like. Ring 40 is made of an electrical insulation material, such as a suitable plastic material, or the like. Ring 40 is bonded to wall opening 42 using an adhesive (not shown) or the like.

Pin 12 has a peripheral finger tip groove 44. Pin 12 has switch portions or bridge portions 46, 48, which bridge over slots 20, 21, when pin 12 is positioned fully inside socket 14. When bridges 46, 48 are positioned, lead 26 is connected to leads 28 and 30. Lead 26 is connected to a battery positive portion (not shown). Lead 28 is connected to an internal sensor circuit (not shown).

In operation, pin 12 connects to positive conductor 16 and to connector 30 which in turn connects to the positive terminal of the battery. Pin 12 also connects to sensor conductor 18, which in turn connects to a sensor circuit. Although insulator mediums 20, 21 are disposed between conductors 16, 18, the bridge portions 46, 48 provide electrical connections between conductors 16, 18, when pin 12 is inserted into socket 14.

During shutdown and storage, bridge portions 46, 48 are disconnected from conductors 16, 18, and pin 12 is pulled out from socket 14. Insulator mediums 20, 21 insulate conductor 16 from conductor 18. Exterior positive connector 30 is disconnected from inner positive conductor 16. Inner positive conductor 16 is disconnected from inner sensor conductor 18. Thus, the storage shelf life of battery 22 is extended.

As shown in FIGS. 4, 5 and 6, a second embodiment or battery connector 50 is provided. Parts of second embodiment 50, which are the same as corresponding parts of first embodiment 10, have the same numerals, but with a subscript "a" added thereto.

Connector 50 has a metal pin 12a and has a socket 14a. Pin 12a and socket 14a have a common axis 15a. Socket 14a has an upper conductor or cylinder 16a, and has a lower cylinder 18a. Socket 14a also has an insulator ring 52. Socket 14a is mounted on a battery 22a, and extends from a battery wall 24a. Upper cylinder 16a has an upper lead 26a. Lower cylinder 18a has a lower lead 28a. Pin 12a has a lead 30a. Upper lead 26a has a horizontal clip 54. Lower lead 28a has a lower horizontal clip 56.

Pin 12a has a blind hole 36a which contains solder material 38a for fixedly connecting pin 12a to lead 30a. Upper cylinder 16a is press fit into a hole 42a in wall 24a. Pin 12a has a finger grip groove 44a. Insulating ring 52 has an upper edge 58, which is bonded to conductor 16a by an adhesive (not shown). Ring 52 has a lower edge 60, which is bonded to conductor 18a by an adhesive (not shown). Pin 12a has a bridge portion 62, which bridges over ring 52. and which electrically connects lead 26a to lead 28a, when pin 12a is inserted within socket 14a.

In operation, pin 12a connects to conductor 16a and conductor 30a. Also, pin 12a connects to conductor 18a. Bridge portion 62 provides an electrical connection between conductors 16a, 18a. During shutdown and storage, bridge 62 is disconnected from conductors 16a, 18a. Insulator 52 insulates conductor 16a from conductor 18a. Conductor 30a is disconnected from conductor 16a. Thus, in storage, the storage shelf life of battery 22a is extended.

As shown in FIGS. 7, 8 and 9, a third embodiment or battery connector 100 is provided. Parts of third embodiment 100 which are the same as corresponding parts of first embodiment 10, have the same numerals but with a subscript "b" added thereto.

Connector 100 has a metal pin 12b and has a socket 14b. Pin 12b and socket 14b have a common axis 15b. Socket 14b has an upper metal cylinder 16b and has a lower metal plate 18b. Socket 14b also has an insulator medium or air gap 102. Socket 14b has an L-shaped bracket 104, which is made of an insulating plastic material or the like. Bracket 104 is fixedly connected to parts 16b, 18b, by an adhesive (not shown) or by screws, or the like. Plate 18b has a frustoconical top surface 106 for better contact with pin 12b. Socket 14b is mounted on a battery 22b, and extends from a battery wall 24b.

Upper cylinder 16b has an upper lead 26b. Lower plate 18b has a lower lead 28b. Pin 12b has a lead 30b. Upper lead 26b has a horizontal clip 108. Lower lead 28b has a lower horizontal clip 110.

Pin 12b has a blind hole 36b, which contains solder material 38b for fixedly connecting pin 12b to lead 30a. Upper cylinder 16b is press fit into a wall opening 42b in wall 24b. Pin 12b has a finger grip groove 44b. Pin 12b has a bridge portion 112 which bridges over insulator gap 102, and which electrically connects lead 26b to lead 28b, when pin 12b is inserted within socket 14b.

In operation, pin 12b connects to conductor 16b and conductor 30b. Also, pin 12b connects to conductor 18b. Bridge portion 112 provides an electrical connection between conductors 16b, 18b. During shutdown and storage, bridge 112 is disconnected from conductors 16b, 18b. Then insulator gap 102 insulates conductor 16b from conductor 18b. Also, conductor 30b is disconnected from conductor 16b. Thus, in storage, the storage shelf life of connector 100 is extended.

As shown in FIGS. 10, 11, and 12, a fourth embodiment or battery connector 150 is provided. Parts of fourth embodiment 150, which are the same as corresponding parts of first embodiment 10, have the same numerals, but with a subscript "b" added thereto.

Connector 150 has a metal pin 12c, and has a socket 14c. Pin 12c and socket 14c have a common axis 15c. Socket 14c has an outer metal cylinder 16c, and has an inner metal cylinder 18c. Socket 14c also has an insulator cylinder 152 disposed between outer cylinder 16c and inner cylinder 18c. Cylinder 152 is made of an insulating material. Socket 14c is mounted on a battery 22c, and extends from a battery wall 24c.

Outer cylinder 16c has an upper lead 26c. Inner cylinder 18c has a lower lead 28c. Pin 12c has a lead 30c. Upper lead 26c has a horizontal upper clip 154. Lower lead 28c has a horizontal lower clip 156.

Pin 12c has a blind hole 36c, which contains solder material 38c, for fixedly connecting pin 12c to lead 30c. Outer cylinder 16c is press fit into a wall opening 42c in wall 24c. Pin 12c has a finger grip groove 44c. Pin 12b has a bridge assembly 46c. Bridge assembly 46c has four cantilever fingers or bent strips 158, 160, 162, 164, which are formed in inner cylinder 18c. Insulator cylinder 152 has four windows or openings 166, 168, 170, 172, which are disposed radially outwardly of respective strips 158, 160, 162, 164. When pin 12c is positioned within inner cylinder 18c, cantilever strips 158, 160, 162, 164 are each forced radially outwardly at their lower ends, and are in bearing or contact with outer cylinder 16c.

In operation, when pin 12c is within socket 14c, pin 12c connects to conductor 16c and conductor 30c. Also, pin 12c connects to conductor 18c. Bridge means 46c provides an electrical connection between conductors 16c, 18c. During shutdown and storage, bridge means 46c is disconnected from conductors 16c, 18c, as pin 12c is withdrawn from socket 14c. Then, insulator cylinder 152 and air gaps at windows 166, 168, 170, 172 insulates conductor 16c from conductor 18c. Also, conductor 30c is disconnected from conductor 16c. Thus, in storage, the shelf life of connector 150 is extended.

A method is provided for connecting a battery which automatically turns on or shuts off an inner sensor circuit of the battery when the battery is respectively connected or disconnected. This method includes the steps of: connecting a pin to an exterior positive connector; connecting the pin to a first conductor which is placed inside the battery for connection to a battery positive portion; connecting the pin to a second conductor which is placed inside the battery for connection to a sensor circuit; disposing an insulator between the first conductor and the second conductor; and bridging the insulator while simultaneously connecting the first conductor to both the second conductor and the exterior positive connector.

The advantages of connectors 10, 50, 100, 150 are indicated hereafter.

A) A connector 10, 50, 100 or 150 is provided for a battery, which has an inner battery sensor circuit, that an be turned off during storage of the battery.

B) A connector 10, 50, 100 or 150 is provided for a battery, which has an inner battery sensor circuit, that can be automatically turned on and shut off respectively upon connection and disconnection of the battery.

C) A simple low cost power/signal receptacle or socket 14, 14a, 14b, or 14c is provided which will extend the shelf life of a battery which uses an internal monitoring system.

D) Connector 10, 50, 100 or 150, provides two internal circuits, which shut down automatically during storage.

E) Connector 10, 50, 100 or 150 provides an inner sensor circuit switch, which is self activated and which is invisible to the user.

While the invention has been described in its preferred embodiment, it is to be understood that the words which have been used are words of description rather than limitation and that changes may be made within the purview of the appended claims without departing from the true scope and spirit of the invention in its broader aspects.

For example, power and signal connector 10 can be used to control internal circuits of other devices, in place of an internal circuit of a battery.

As another example, connector 10 can be a multi-circuit connector, which has more than the two conductors 16, 18.

As a further example, pin 12c can be made of a non-conductive material, instead of a conductive metal material, in the fourth embodiment 150, for checking only the inner sensor circuit during storage, or a like use.

What is claimed is:

1. A connector for a battery comprising:
   a pin having an axis and being axially displaced;
   a socket for positioning the pin therein and coaxially therewith, said socket having first and second metal conductors and being mounted on a battery and extending through a wall of the battery;
   wherein the first metal conductor has a first conductive portion for connection to a positive battery terminal, the second metal conductor has a second conductive portion for connection to a battery sensor circuit, and the first and second metal conductors form a recess for positioning the pin in the recess for contact with the pin;
   an insulating medium disposed between the first and second conductors; and
   bridge means which connects the first conductor to the second conductor only when the pin is positioned within the socket.

2. The connector of claim 1, wherein
   the first metal conductor and second metal conductor are elongate members each having an arcuate cross-section and being separated by two elongate slots; and
   the insulating medium is an air gap.

3. The connector of claim 1, wherein
   the first metal conductor is a cylinder;
   the second metal conductor is a round plate axially spaced from the cylinder coaxially therewith;
   the insulating medium is a ring made of insulating material; and
   the ring has an edge fixedly connected to the cylinder and has a second edge fixedly connected to the round plate.

4. The connector of claim 1, wherein
   the first metal conductor is a cylinder;
   the second metal conductor is a round plate axially spaced from the cylinder coaxially therewith;
   the first and second metal conductors have a bracket for support of the second metal conductor by the first metal conductor.

5. The connector of claim 1, wherein
   the first metal conductor is an outer cylinder;
   the second metal conductor is an inner cylinder;
   the insulating medium is a middle cylinder disposed between the outer and inner cylinder and is made of an insulating material;
   the inner cylinder has a plurality of cantilever bent strips;
   the bent strips each has a middle portion engaged by the pin when the pin is in position within the socket and each bent strip has an outer end in bearing against the outer cylinder when the strip middle portion is engaged by the pin; and
   the middle cylinder has an opening disposed radially outwardly of each strip for movement therethrough of the strip outer end.

* * * * *